(12) United States Patent
Thomas et al.

(10) Patent No.: US 8,517,183 B2
(45) Date of Patent: Aug. 27, 2013

(54) NO FILTER NO RUN FLUID FILTRATION SYSTEM

(75) Inventors: Chad M. Thomas, Cookeville, TN (US); Eric Burgan, Baxter, TN (US); Mark J. Johnson, Cookeville, TN (US); Jeffrey A. Husband, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 959 days.

(21) Appl. No.: 12/434,863

(22) Filed: May 4, 2009

(65) Prior Publication Data

US 2010/0276358 A1 Nov. 4, 2010

(51) Int. Cl.
*B01D 27/00* (2006.01)

(52) U.S. Cl.
USPC ............................ 210/418; 210/431; 210/456

(58) Field of Classification Search
USPC ................... 210/418–432, 456; 55/418–432, 55/456
See application file for complete search history.

(56) References Cited

U.S. PATENT DOCUMENTS

| | | | |
|---|---|---|---|
| 3,363,762 A | 1/1968 | Ensign | |
| 3,508,657 A * | 4/1970 | Cooper | 210/90 |
| 4,303,514 A | 12/1981 | Theorell | |
| 5,049,269 A | 9/1991 | Shah | |
| 5,215,655 A | 6/1993 | Mittermaier | |
| 5,362,390 A | 11/1994 | Widenhoefer et al. | |
| 5,846,417 A | 12/1998 | Jiang et al. | |
| 5,855,780 A | 1/1999 | Dye et al. | |
| 6,053,334 A | 4/2000 | Popoff et al. | |
| 6,113,781 A | 9/2000 | Popoff et al. | |
| 6,171,491 B1 * | 1/2001 | Popoff et al. | 210/235 |
| 6,495,042 B1 | 12/2002 | Knight | |
| 6,554,139 B1 | 4/2003 | Maxwell et al. | |
| 6,884,349 B1 | 4/2005 | Jiang | |
| 7,335,300 B1 * | 2/2008 | Stamey et al. | 210/234 |
| 2003/0015465 A1 * | 1/2003 | Fick et al. | 210/234 |
| 2009/0020465 A1 | 1/2009 | Jiang et al. | |
| 2009/0065419 A1 | 3/2009 | Jiang | |
| 2009/0065425 A1 | 3/2009 | Juang | |
| 2009/0065427 A1 | 3/2009 | Jiang | |
| 2009/0065447 A1 | 3/2009 | Forrest et al. | |
| 2009/0090668 A1 | 4/2009 | Abdalla et al. | |
| 2009/0114588 A1 | 5/2009 | Bagci et al. | |
| 2009/0134087 A1 | 5/2009 | Hawkins et al. | |

FOREIGN PATENT DOCUMENTS

| | | | |
|---|---|---|---|
| EP | 1 008 375 A1 | 6/2000 | |
| EP | 1008375 A1 * | 6/2000 | |

OTHER PUBLICATIONS

U.S. Appl. No. 12/152,373, filed May 14, 2008.
U.S. Appl. No. 12/251,849, filed Oct. 15, 2008.
U.S. Appl. No. 12/271,545, filed Nov. 14, 2008.
International Search Report for application No. PCT/US2010/024711, dated Sep. 28, 2010 (4 pages).
Written Opinion of the International Searching Authority for application No. PCT/US2010/024711, dated Sep. 28, 2010 (3 pages).

* cited by examiner

*Primary Examiner* — Duane Smith
*Assistant Examiner* — Thomas McKenzie
(74) *Attorney, Agent, or Firm* — Hamre, Schumann, Mueller & Larson, P.C.

(57) ABSTRACT

An upper endcap of a fuel filter cartridge includes a skirt, an axially extending pin surrounded by the skirt, and a plurality of ribs that define fluid flow channels leading to the pin. The pin is extendable through an axially facing fuel inlet opening at the upper end of a standpipe for actuating a valve to an open position allowing fuel to flow through the axially facing inlet opening and into the standpipe. The valve can include a hole that receives the pin therein to help stabilize the valve when the valve is actuated open.

14 Claims, 7 Drawing Sheets

NO FILTER NO RUN FLUID FILTRATION SYSTEM

FIELD

This disclosure generally pertains to the field of filtration, and more particularly to fluid filtration systems and related components designed to safe-guard against damage to components such as fuel injectors and associated fuel components, and system malfunctions resulting from a missing or incorrect fluid filter.

BACKGROUND

It is known to use a valve in a fuel filter housing to control fuel flow through the housing. One example of such a valve in a fuel filter housing is sometimes referred to as a "no filter, no run" valve, where the valve prevents flow of fuel to the engine or fuel injection system if no fuel filter is installed or if the incorrect fuel filter is installed. In this type of system, not only must a fuel filter be present, but the correct fuel filter must be used, in order to allow fuel to flow past the valve to the engine in sufficient quantities to allow the engine to function properly.

SUMMARY

Improvements relating to "no filter, no run" fluid filtration systems and components used in such systems are described. In a "no filter, no run" fluid filtration system, fluid flow to a downstream component(s) is prevented if a filter cartridge is not installed, and an appropriately designed filter cartridge is required to be installed in order to permit fluid flow. This safeguards against damage to downstream components and malfunctions of equipment in which the fluid filtration system is used. The type of "no filter, no run" fluid filtration systems that can utilize the described improvements can be a number of systems including, but not limited to, a fuel filtration system, for example on an engine such as a diesel or gasoline engine, a hydraulic fluid filtration system in a hydraulic system, other engine fluid filtration systems on diesel or gasoline engines, as well as filtration systems used in non-engine applications.

As described further herein, a filter cartridge is provided that is designed to actuate a valve that controls fluid flow through an axially facing (facing in the direction of insertion of the filter cartridge) fluid inlet opening on a filter housing, for example on a standpipe in the filter housing. At the same time, the filter cartridge is configured to allow fluid to flow past the filter cartridge and through the axially facing fluid inlet opening. In the case of a fuel system, fuel can flow through the axially facing fluid inlet opening and past the valve on its way to downstream components, for example fuel injectors and associated fuel system components.

In one example, the filter cartridge includes filtering media that defines an interior space. The filtering media has first and second ends, and a first endcap is coupled to the first end of the filtering media. The first endcap includes an opening defined therein that leads to the interior space and the opening is designed to accommodate a standpipe. A second endcap is coupled to the second end of the filtering media. The second endcap is devoid of openings for fluid to flow therethrough. In addition, the second endcap includes a disk portion secured to the second end of the filtering media, a skirt extending from the disk portion toward the interior space, an axially extending pin surrounded by the skirt and extending toward the interior space, and a plurality of ribs that define fluid flow channels leading to the pin.

With this construction, when the filter cartridge is installed, the pin is positioned and configured to actuate a flow control valve associated with a filter housing that receives the filter cartridge. Further, fluid can flow via the fluid flow channels through the axially facing fluid inlet opening on its way to downstream components.

The filter housing that receives the filter cartridge can be configured in a number of ways, as long as it has an axially facing fluid inlet opening through which the pin on the filter cartridge can extend, and a valve controlling fluid flow through the fluid inlet opening that is actuated by the pin.

For example, the filter housing can include a housing body defining a filter cartridge space for receiving the filter cartridge, and a standpipe disposed in the filter cartridge space that is receivable through the opening in the first endcap of the filter cartridge. The standpipe includes an internal flow passage, and the axially facing fluid inlet opening that places the internal flow passage in communication with the filter cartridge space. The axially facing fluid inlet opening is disposed at a first end of the standpipe and is configured to receive the pin of the filter cartridge therethrough for actuating the valve. The valve is disposed in the standpipe adjacent the first end thereof and controls fluid flow through the axially facing fluid inlet opening and into the internal flow passage. The valve is axially moveable between a first position preventing fluid flow through the axially facing fluid inlet opening and into the internal flow passage and a second position at which fluid flow through the axially facing fluid inlet opening and into the internal flow passage is permitted. The valve includes a valve poppet and a spring engaged with the valve poppet that biases the valve poppet to the first position. The valve poppet and the standpipe are configured such that a flow path is defined between the valve poppet and the standpipe when the valve poppet is at the second position thereby permitting fluid flow through the axially facing fluid inlet opening and into the internal flow passage.

The poppet can include a hole defined therein that is configured to receive the end of the pin on the filter cartridge. In addition, the spring can be a coil spring that surrounds a portion of the valve poppet. The pin extending into the hole and the coil spring surrounding the valve poppet help to stabilize the valve poppet and prevent lateral side-to-side movement or flutter of the valve poppet.

DRAWINGS

DETAILED DESCRIPTION

Figure 1:
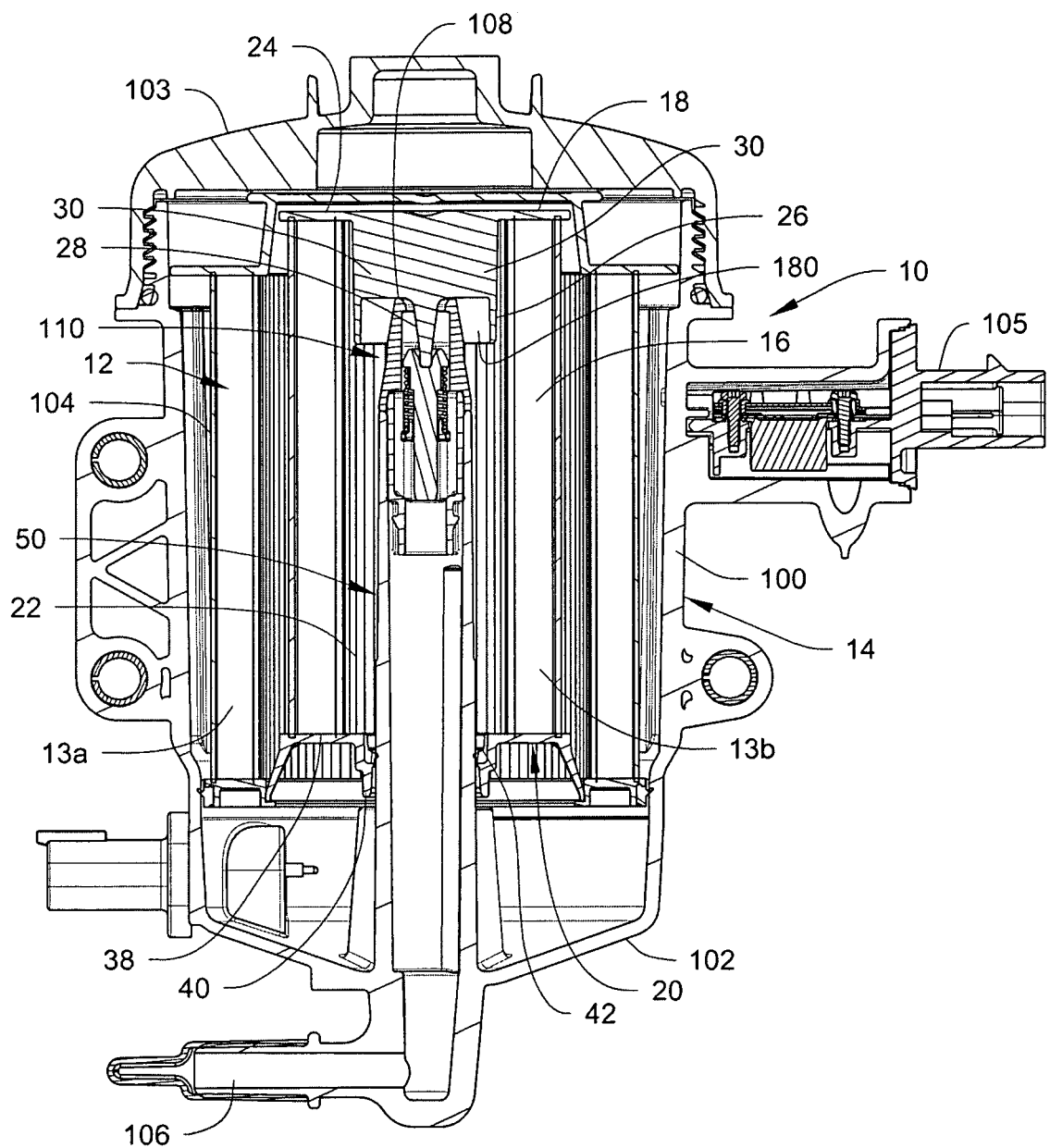
FIG. 1 is a cross-sectional side view of a filter housing with an installed filter cartridge described herein.

FIG. 1 illustrates an assembly 10 that includes a filter cartridge 12 disposed within a filter housing 14. The assembly 10 can be, for example, used in a fuel system for filtering fuel, for example diesel fuel, before the fuel reaches a protected system, for example a fuel injection pump or fuel injectors. While this description will hereinafter describe the filter cartridge and filter housing as being used to filter fuel, it is to be realized that the concepts described herein can be used for other fluids. For example, in appropriate circumstances, one or more of the concepts described herein can be applied to other types of assemblies that filter other types of fluids, for example lubrication, hydraulic and other liquids, as well as air.

In the example described herein, the filter cartridge 12 is configured to filter fuel. In addition, the filter cartridge 12 is illustrated as a dual-stage, filter-in-filter style filter cartridge having an outer filter element 13a and an inner filter element 13b. Further details on a filter-in-filter style filter cartridge can be found in U.S. application Ser. No. 11/937,700. Alternatively, the filter cartridge 12 can be a single-stage type filter cartridge with a single filter element, and the concepts of the filter cartridge described herein apply equally well to a single-stage type filter cartridge.

The construction of the outer filter element 13a is not critical to the concepts described herein, and a number of configurations of the element 13a are possible. For example, the element 13a can be similar to the outer filter element described in U.S. application Ser. No. 11/937,700. However, other configurations are possible.

Figure 2:
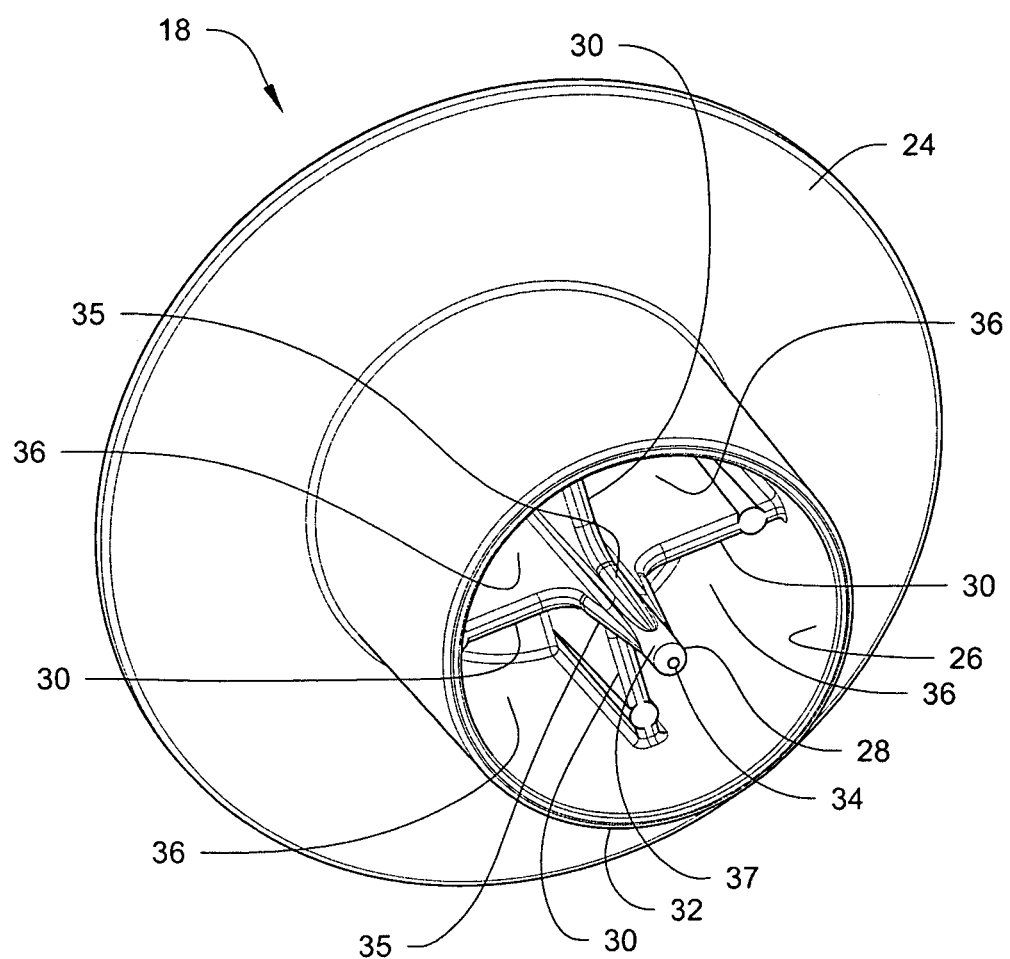
FIG. 2 is a bottom perspective view of the upper endcap of the inner filter element of the filter cartridge.

With reference to FIGS. 1 and 2, the inner filter element 13b of the filter cartridge 12 includes filter media 16, an upper endcap 18 secured to an upper end of the media 16 and closing the upper end, and a bottom endcap 20 secured to a bottom end of the media 16. The ends of the filter media 16 are secured to the endcaps 18, 20 in any suitable manner, for example embedding the media into the endcaps or by using an adhesive to adhere the media to the endcaps. The endcaps 18, 20 can be made of, for example, a plastic material or other material compatible with the fuel or other fluid being filtered.

The filter media 16, which in the illustrated example is a cylindrical ring in lateral cross-section, defines an interior space 22. The filter media 16 can take on any lateral cross-sectional shape, for example the cylindrical ring, triangular, oval, as long as it defines interior space 22. In the example described herein, the interior space 22 defines a clean fuel side that receives filtered fuel that has been filtered by the media 16, in which case the filter cartridge 12 is configured for outside-in flow. The filter cartridge 12 could also be constructed for inside-out flow, in which case the interior space 22 is the dirty fuel side and fuel flows outwardly through the filter media 16 toward a clean fuel side.

The filter media 16 is designed to remove unwanted contaminants from the fuel. For example, the filter media 16 can be configured to remove soft and solid particulate contaminants and/or water from the fuel. A person of ordinary skill in the art would know the appropriate filter media to use for filtering the fuel or other fluid.

With continued reference to FIGS. 1 and 2, the upper endcap 18 is closed, i.e. the upper endcap is devoid of openings for fuel to flow therethrough. In appropriate circumstances, the upper endcap 18 could include bypass openings therein as part of a bypass mechanism that allows fuel to bypass the filter media. Bypass mechanisms are known to those of ordinary skill in the art.

The upper endcap 18 includes a generally circular, horizontal disk portion 24 with an annular perimeter portion that is attached to the upper end of the filter media 16. An annular skirt 26 extends axially downward from the disk portion 24 toward and into the interior space 22. In the illustrated example the skirt 26 is circumferentially continuous and is devoid of fluid flow openings. However, fluid flow openings can be formed in the skirt to allow additional fuel flow past the skirt.

In addition, the endcap 18 includes a pin 28 that extends axially downward toward and into the interior space 22, and a plurality of ribs 30. The pin 28 is illustrated as being substantially centrally disposed along the central axis of the endcap 18 and along the central axis of the filter media 16. However, in another example the pin can be offset from the central axis. Further, although only a single pin is illustrated, multiple pins can be used. When multiple pins are used, at least one pin would be offset from the central axis of the filter media.

The ribs 30 are illustrated as being generally rectangular in shape, extending generally downward from base ends where they connect to the bottom surface of the disk portion 24 to axially distal ends that do not extend past the bottom edge 32 of the skirt 26. The ribs 30 also have radially outer ends connected to the inner surface of the skirt 26 and radially inner ends that are adjoined to each other at the central longitudinal axis of the endcap 18. The ribs 30 are circumferentially spaced from each other, defining fluid flow channels 36 therebetween.

The pin 28 includes a base end that is connected to and extends from the radially inner ends of the ribs 30. Alternatively, the pin 28 can be considered to extend from the bottom surface of the disk portion 24, with the radially inner ends of the ribs joining to the outer surface of the pin 28. The pin 28 also includes an axially distal or free end 34 that extends axially below (i.e. projects past) the bottom edge 32 of the skirt, as shown in FIGS. 1 and 2. In the example illustrated, the pin 28 has a generally "+" (plus) or cross shape when viewed in lateral cross-section due to transition sections 35 extending from the ribs 30. The transition sections 35 help reinforce and stiffen the pin 28, to prevent deformation and/or breakage of the pin 28. The transition sections 35 taper in size as they extend toward the free end, with the sections 35 stopping short of the free end 34 leaving a portion 37 of the pin 28 that is devoid of the transition sections 35 and thus not having the generally "+" (plus) or cross shape. The portion 37 is generally circular in lateral cross-section and has a substantially constant diameter from where the sections 35 end to the free end 34.

However, other pin shapes can be used as long as the pin(s) can cooperate with and actuate the valve as discussed below. The pin(s) can also take the form of ribs, teeth or any type of protrusion capable of cooperating with and actuating the valve. Thus, as used herein, a pin is intended to encompass a protrusion like that illustrated in FIGS. 1 and 2, as well as ribs, teeth, or other protrusions capable of cooperating with and actuating the valve in a manner similar to the pin 28 described herein.

In the illustrated example, the skirt 26, the pin 28 and the ribs 30 are integrally formed with the endcap 18. However, one or more of these features can be non-integrally formed with the endcap 18. For example, the pin and the ribs can be part of an assembly that is formed separately from the endcap 18, and thereafter secured to the endcap 18, for example via a snap fit connection of the assembly to the skirt 26.

As shown in FIG. 1, the bottom endcap 20 includes a generally circular, horizontal disk portion 38 with an annular perimeter portion that is attached to the bottom end of the filter media 16. The disk portion 38 includes an opening 40 therein that accommodates a standpipe 50 of the filter housing 14 during use which extends through the opening 40. A gasket 42 is disposed in the opening 40 for sealing engagement with the standpipe. The specific configuration of the bottom endcap 20, including the disk portion 38, the opening 40 and the gasket 42, is not critical to the concepts described herein, and numerous configurations are possible, as long as the bottom endcap 20 includes an opening to allow passage of the standpipe 50 and means are provided (either on the endcap 20 and/or on the standpipe) for sealing engagement between the bottom endcap and the standpipe to prevent fuel leakage between the bottom endcap and the standpipe.

The illustrated example of the filter housing 14 includes a housing body that has a side wall 100 and an end wall 102. The side wall 100 and the end wall 102 define a filter cartridge space 104 that is large enough to receive the filter cartridge 12 therein, with the end wall 102 forming a closed end of the space 104. The housing body has an open end generally opposite the end wall, with the open end in use being closed by a lid 103 that closes off the space 104. The housing body also includes an inlet 105 through which fuel to be filtered enters the space 104, and an outlet 106, for example extending from the end wall, through which fuel exits on its way to the engine. Further details on a filter housing can be found in U.S. application Ser. No. 11/937,700. However, it is to be realized that the filter housing 14 could have other configurations than that described herein.

The standpipe 50 extends upwardly from the end wall 102 into the interior space 104 toward the open end. The standpipe 50 is illustrated as being centrally disposed in the housing body coaxial with the central axis of the housing body. The standpipe 50 forms a fluid passageway member that is generally hollow from its end connected to the end wall to a tip end thereof, thereby defining an internal fuel flow passage. As illustrated, the fuel flow passage is in communication with the outlet 106 so that fuel that enters the standpipe 50 can flow from the standpipe and into the outlet to the engine. Fuel enters the standpipe 50 through an axially facing inlet opening 108 at the top end thereof that places the internal flow passage of the standpipe 50 in communication with the filter cartridge space 104, particularly the interior space 22 of the filter element 13b.

As used herein, an axially facing inlet opening or the like is a fluid inlet opening that faces generally in the direction of insertion/removal of the filter cartridge into/from the filter housing. The axially facing inlet opening 108 need not be oriented perpendicular to the insertion/removal direction as is illustrated. Instead, an axially facing fluid inlet opening 108 is intended to encompass any orientation of the opening 108 relative to the insertion/removal direction that allows the pin 28 to extend therethrough and cooperate with and actuate the valve as described herein.

The axially facing inlet opening 108 is illustrated as being disposed along the central axis of the standpipe 50 and along the central axis of the filter media 16, with the center of the opening 108 coaxial with the central axis. In another example, the axially facing inlet opening 108 can be offset from the central axis so that the center of the opening 108 is offset from the central axis. When the opening 108 is offset, the central axis could nonetheless extend through the openings 108 or the opening 108 could be configured and arranged such that the central axis does not extend through the opening 108. Further, while a single opening 108 is illustrated, multiple openings 108 can be provided if a single or a plurality of pins 28 are provided. In another example, a single opening 108 could accommodate multiple pins.

Therefore, the number of pins 28 and their location(s), orientation(s) and configuration(s), and the number of openings 108 and their location(s), orientation(s) and configuration(s), can vary as long as the pin(s) can extend through the opening(s) 108 to cooperate with and actuate the valve.

The standpipe 50 can have any lateral cross-sectional shape one finds suitable for use. In one example, the standpipe 50 is oval-shaped in lateral cross-section from the bottom end to the tip end. An example of an oval standpipe is disclosed in U.S. Pat. No. 6,884,349. The standpipe can also have other lateral cross-sectional shapes, for example circular. The opening 40 and gasket 42 will have a shape that corresponds to the outer circumferential surface of the standpipe. For example, if the standpipe is oval-shaped in lateral cross-section, the opening 40 and the gasket 42 will also be oval-shaped. Likewise, if the standpipe is circular-shaped in lateral cross-section, the opening 40 and the gasket 42 will also be circular-shaped.

A valve assembly 10 is disposed at the top end of the standpipe 50 to control the flow of fuel into the standpipe. The valve assembly 110 is configured to prevent fuel flow into the standpipe when the filter cartridge is not installed or when an incorrect filter cartridge is installed. With reference FIGS. 1 and 3-6, the valve assembly 110 includes a first portion 112 and a second portion 114 that are connectable together during assembly and insertable into the upper end of the standpipe 50 to define the top end of the standpipe. When inserted, the valve assembly 110 is retained in the standpipe by an interference fit and/or using auxiliary means such as adhesive, and forms the top end of the standpipe. The valve assembly 110 can be configured to be used with standpipes of various shapes, such as circular or oval. The first and second portions 112, 114 of the valve assembly 110 can be made of, for example, plastic.

Figure 3:
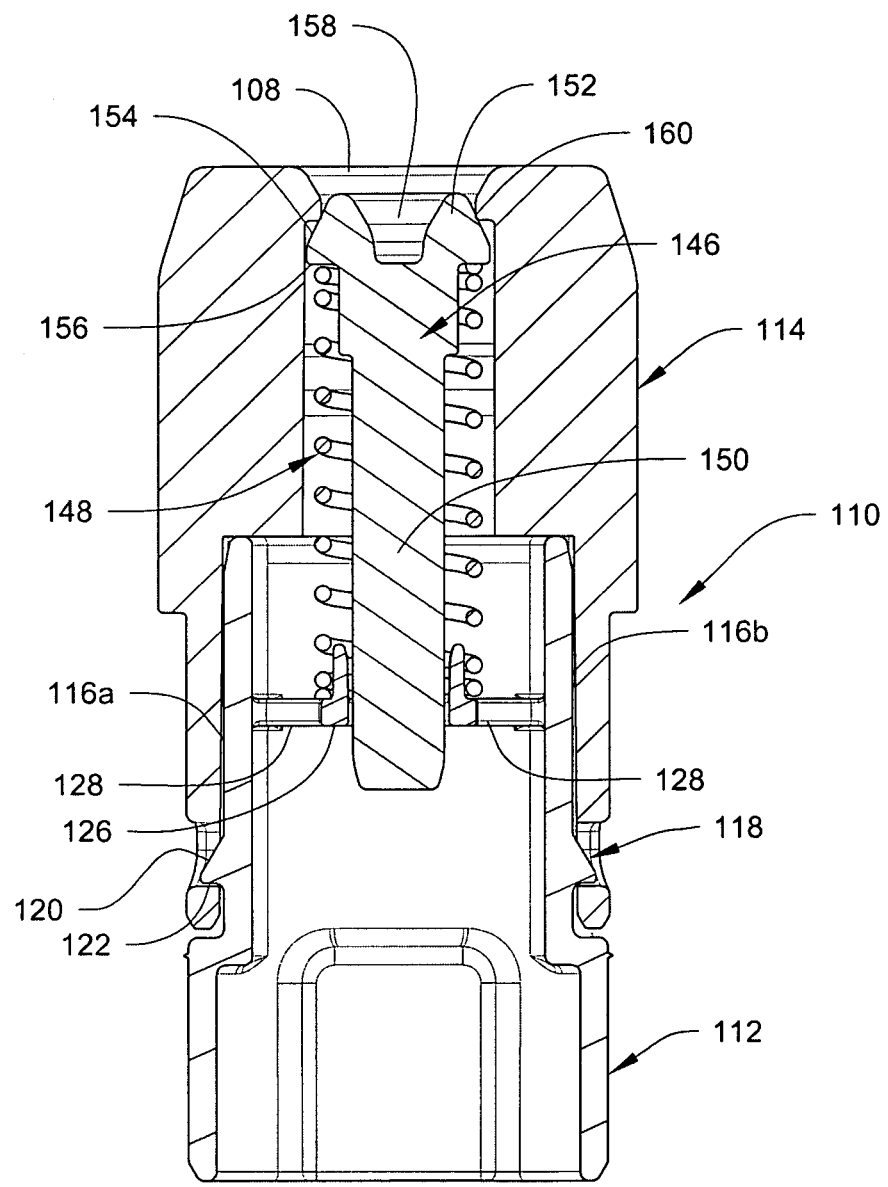
FIG. 3 is a detailed view of a valve assembly that is disposable at the top end of the standpipe, with the valve of the valve assembly at the first or closed position.
Figure 4:
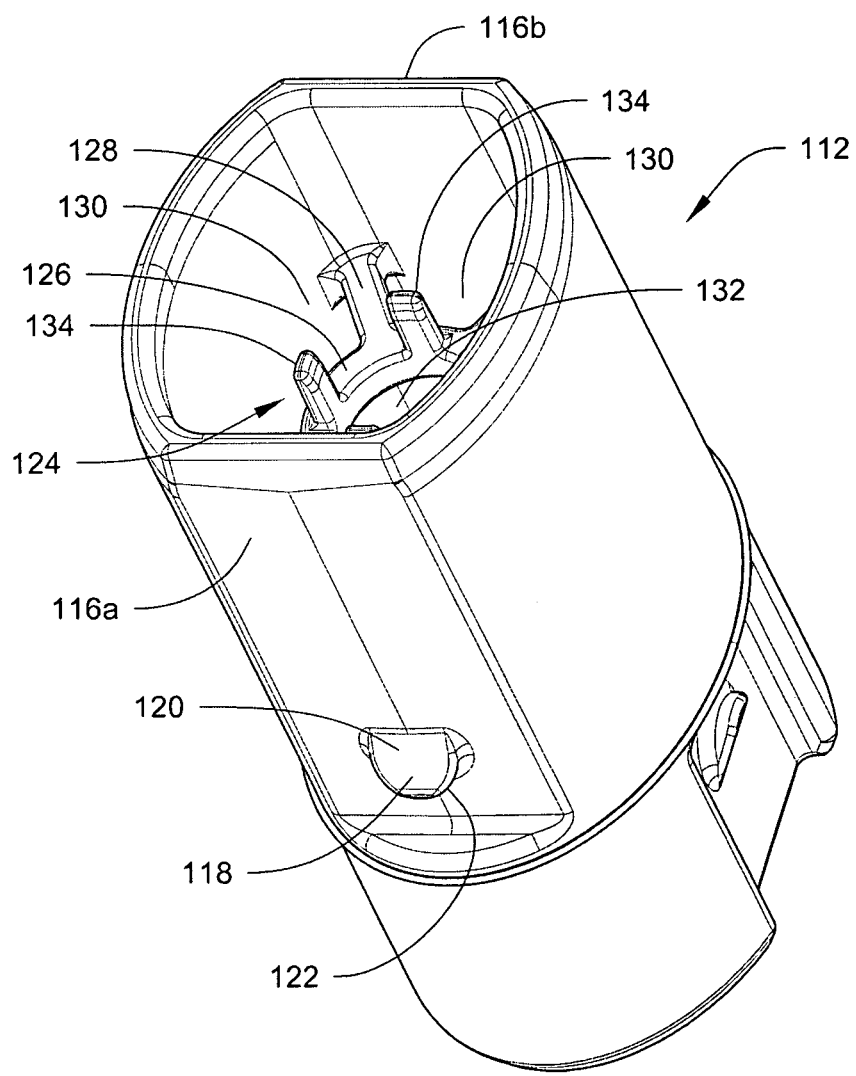
FIG. 4 is a perspective view of a first portion of the valve assembly.

With reference to FIGS. 3 and 4, the first portion 112 comprises a generally tubular body with an outer perimeter shape and dimension that is slightly less than the inner perimeter surface of the upper end of the standpipe 50 so that the first portion 112 is receivable within the upper end via a relatively close interference fit. The first portion 112 includes a pair of diametrically opposite flats 116a, 116b, and a snap-fit protrusion 118 is formed on each flat 116a, 116b adjacent the base end thereof. Each snap-fit protrusion 118 includes a ramp surface 120 and a bottom locking ledge 122.

Inside the tubular body of the first portion 112, a retainer 124 is integrally formed with the first portion 112. The retainer 124 comprises a ring 126 that is centered within the first portion 112 by a plurality of standoffs 128 only one of which is visible in FIG. 4. In the illustrated embodiment, four standoffs 128 are used. However, a larger or smaller number of standoffs can be used. The standoffs 128 are spaced from each other and define fluid flow openings 130 therebetween allowing fuel to flow past the retainer 124 and into the remainder of the standpipe.

In the illustrated example, the ring 126 is generally circular and includes an opening 132 that receives a valve stem therethrough as discussed further below. A plurality of circumferentially spaced fingers 134 extend upwardly from the inner circumference of the ring 126. During use, the fingers 134 help stabilize and retain a coil spring of the valve as discussed further below.

Figure 5A:
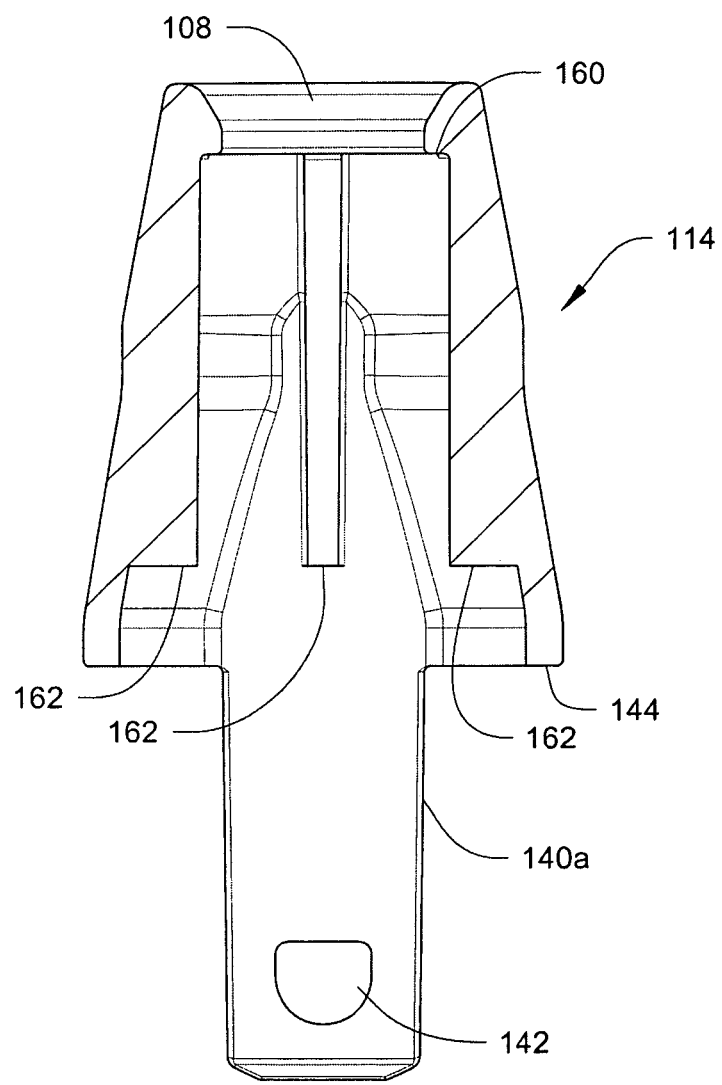
FIGS. 5A and 5B are side sectional views of a second portion of the valve assembly.
Figure 5B:
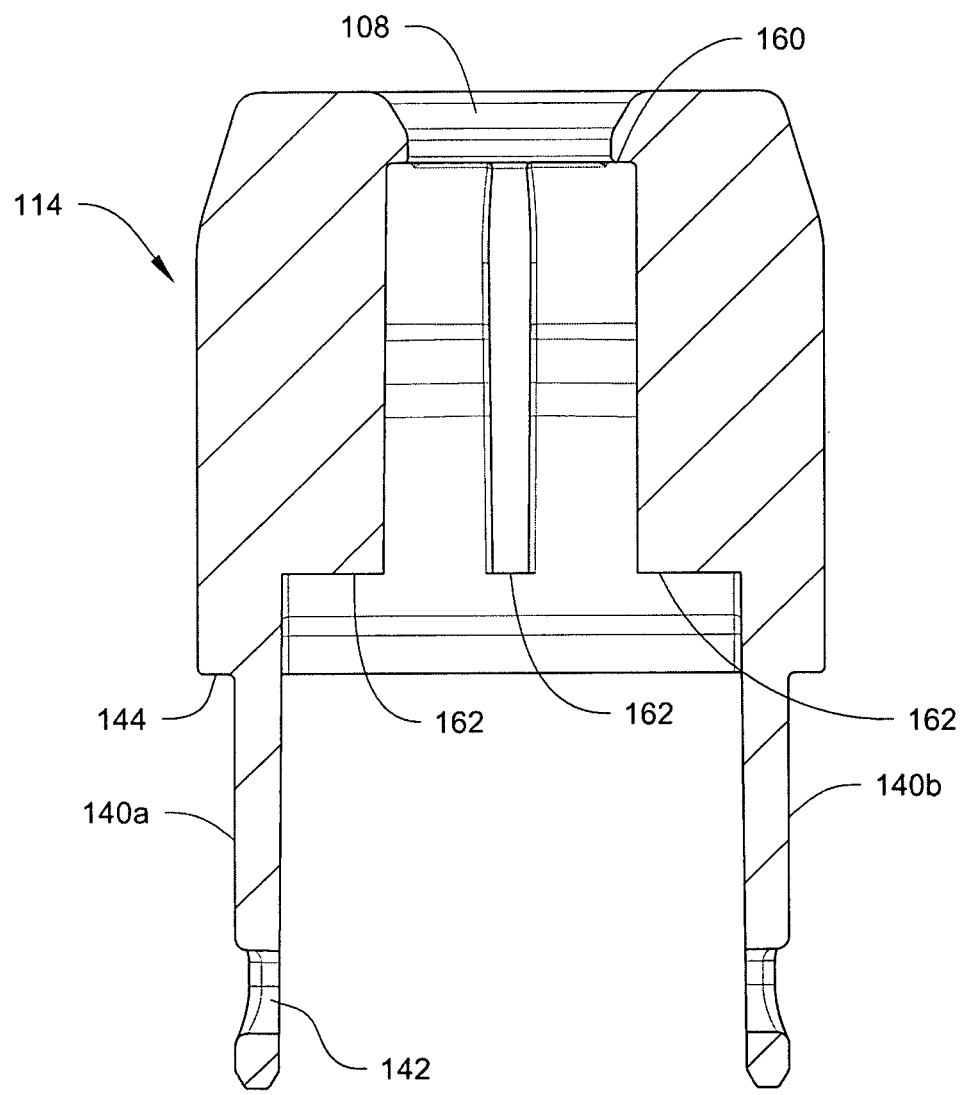
Figure 6:
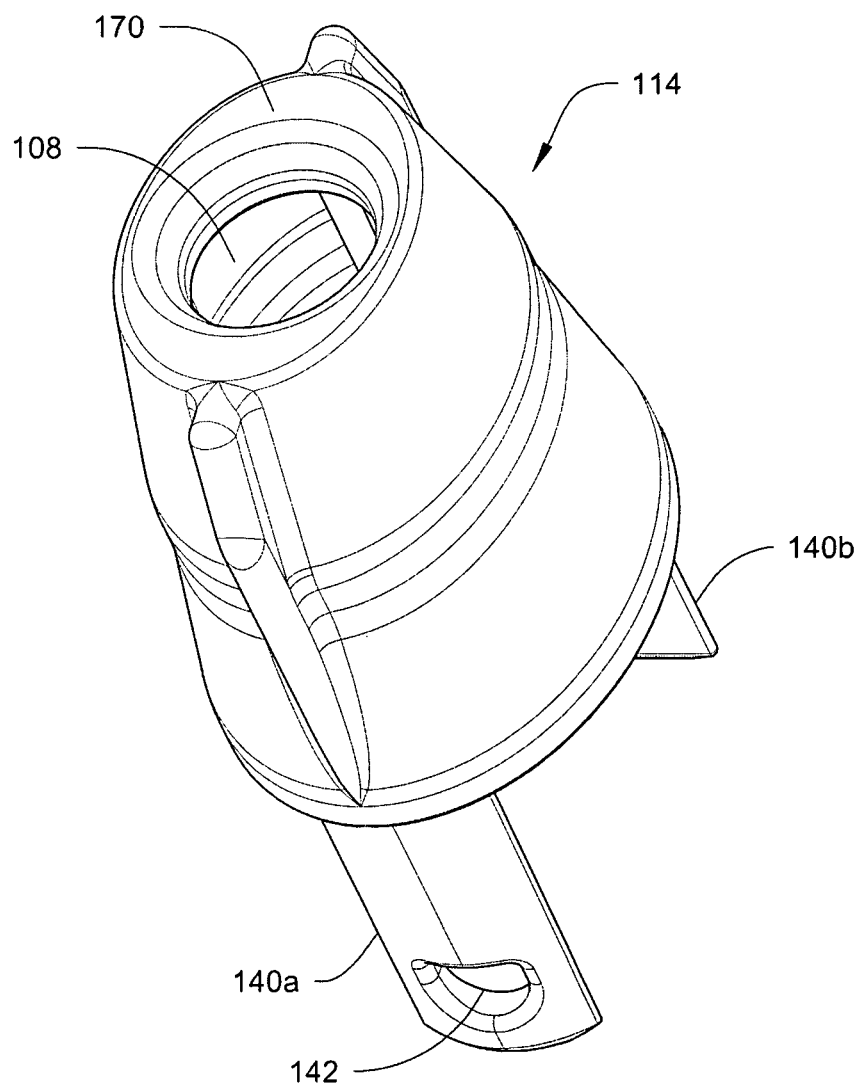
FIG. 6 is a top perspective view of the second portion of the valve assembly.

The second portion 114 is illustrated in detail in FIGS. 5A, 5B and 6 along with FIG. 3. The second portion 114 comprises a generally tubular body with a pair of diametrically opposite arms 140a, 140b that project downwardly from the body. Each arm 140a, 140b includes an opening 142 adjacent the base end thereof that in use forms a snap-fit connection with the protrusions 118. In use, the arms 140a, 140b are slideable over the flats 116a, 116b until the bottom of the arms 140a, 140b engage the ramp surfaces 120. The ramp surfaces 120 deflect the arms 140a, 140b outwardly until the arms clear the ramp surfaces at which time the arms 140a, 140b snap inwardly and lock beneath the bottom locking ledge 122 as illustrated in FIG. 3. The outer surfaces of the arms 140a, 140b generally match and continue the outer perimeter shape of the first portion 112 to help achieve the relatively close interference fit with the inner perimeter surface of the standpipe.

The bottom edge of the second portion 114 defines a shoulder 144. When the valve assembly 110 is fully installed on the standpipe, the shoulder 144 will abut against the upper end of the standpipe 50 to limit insertion of the valve assembly into the standpipe as shown in FIG. 1.

The axially facing inlet opening 108 is defined at the top of the second portion 114. As shown in FIG. 6, the opening 108 is generally circular, although the opening 108 can have any shape that allows passage of the pin 28 and that allows fuel to flow therethrough.

As illustrated in FIG. 3, the valve assembly 110 further comprises a valve poppet 146 and a biasing spring 148. The poppet 146 includes a stem 150 and a valve head 152. The valve head 152 is generally mushroom-shaped with an angled upper surface 154 that extends radially outward and downward from a top surface, and a bottom surface 156 that extends radially inward from the angled surface 154. The poppet 146 includes a hole 158 defined therein that is open axially upward and extends from the valve head 152 downward toward the stem 150. In use, the hole 158 receives the portion 37 of the pin 28 as shown in FIG. 1.

The spring 148 is illustrated as a coil spring that surrounds the stem 150, with one end of the spring 148 engaged with the bottom surface 156 of the valve head 152. The other end of the spring 148 is engaged with the ring 126 of the retainer 124 and surrounds the fingers 134.

The valve poppet 146 is axially movable between a first, sealing position (shown in FIG. 3) and a second, open position shown in FIG. 1. As shown in FIG. 3, when no filter is installed or an appropriately designed filter cartridge is not installed, the valve poppet 146 is normally biased upward to the first position where the angled surface 154 of the valve head 152 is in sealing engagement with a valve seat 160 defined around the axially facing inlet opening 108. At the first position, fuel flow through the inlet opening 108 and into the standpipe 50 is prevented.

Upon installation of an appropriately designed filter cartridge, for example the filter cartridge 12, the pin 28 extends through the opening 108 and into the hole 158 and actuates the valve poppet to the second position shown in FIG. 1. At the second position, fuel is permitted to flow through the axially facing fluid inlet opening 108 and into the standpipe. The pin 28 extending into the hole 158 together with the coil spring 148 surrounding the stem 150 help to stabilize the poppet 146 and prevent lateral side-to-side movement or flutter of the poppet 146.

The pin 28 and the opening 108 need to be configured to provide sufficient flow passage area to allow sufficient amount of fuel to flow into the standpipe for engine operation. One way to quantify the sufficiency of flow passage area is by relating the fuel flow pressure created by the restriction of the pin 28 and the opening 108 to a plugged filter condition. At the time of filing this application, it is believed that the resulting flow restriction created by the pin 28 and opening 108 should be significantly less than 5 psid (5 psid is the flow restriction that generally characterizes the end of useful life condition for a fuel filter). In one exemplary implementation, the diameter of the opening 108 can be about 8.4 mm. With this example diameter of the opening, an effective diameter of the pin 28 of at least about 8.25 mm would create a 5 psid restriction when exposed to normal working fluid at typical application conditions simulating a plugged filter, since the flow restriction is highly dependent on the type of fluid and temperature of the fluid. Therefore, the flow area created by the pin and the opening should be such as to create a resulting flow restriction that is significantly less than 5 psid. In other words, the pin must be configured to contribute to a flow restriction opening must be configured to contribute to a flow restriction that is also significantly less than 5 psid as to not reduce useful life of the filter. For example, one suitable design target flow restriction for fuel is about 0.25 psid across the valve assembly. These flow restriction criteria are for fuel as the fluid flowing into the standpipe at typical operating conditions for the fuel. Other fluids may dictate having other flow restriction criteria.

The pin 28 is illustrated as being substantially solid. However, it is contemplated that the pin 28 could have one or more flow passages defined therein that contribute to creating the flow passage area for the fuel.

To permit fuel flow when at the second position, the valve poppet 146 and the first portion 114 of the valve assembly 110 are configured to define a fuel flow path between the valve poppet and the first portion 114. For example, returning to FIGS. 3, 5A, 5B and 6, the internal surface of the second portion 114 includes a plurality of radially inwardly projecting, circumferentially spaced ribs 162. The ribs 162 extend radially inward a distance so that they are close to the maximum outer diameter of the valve head 152. The ribs 162 also extend axially from adjacent the valve seat 160 toward the shoulder 144, stopping axially short of the shoulder. The gaps between the ribs 162 define fuel flow passages allowing fuel to flow past the valve poppet when the valve head 152 unseats from the valve seat 160. Further, because the ribs 162 project inwardly close to the outer circumference of the valve head, the ribs guide the valve poppet as the valve poppet moves between the first position and the second position.

Other variations of the valve assembly 110 are possible. For example, any configuration can be used where the top end of the standpipe includes an axially facing inlet opening, a valve (for example the poppet 146 and bias spring 148), and a suitable configuration of the valve poppet and the standpipe such that a flow path is defined between the valve poppet and the standpipe when the valve poppet is at the second position thereby permitting fluid flow through the axially facing fluid inlet opening and into the internal flow passage.

The valve assembly 110 need not include the two portions 112, 114. Instead, the first portion 112 could be eliminated, and a suitable retainer can be formed integrally with or installed into the second portion 114 for retaining the bottom end of the spring. In this example, the bottom end of the second portion would be suitably configured to achieve the interference fit with the interior surface of the upper end of the standpipe.

With reference to FIG. 1, when the filter cartridge 12 is installed, the bottom edges of the ribs 30 engage and rest on a top surface 170 of the first portion 114 of the valve assembly 110 that defines the upper end of the standpipe 50, determining the axial insertion limit of the filter cartridge 12. However, other axial limit stop mechanisms could be used. The pin 28 is made long enough to actuate the valve poppet 146 away from the valve seat 160 to permit fuel to flow into the standpipe. The size of the skirt 26 is larger than the size of the first portion 114, allowing fuel to flow through a gap 180 between the skirt and the first portion 114. The fuel then flows through the passages 36 between the ribs 30, into the axially facing inlet opening 108, past the valve poppet 146 and into the remainder of the standpipe.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge comprising:
   filtering media defining an interior space, the filtering media having first and second ends;
   a first endcap coupled to the first end of the filtering media, the first endcap including an opening defined therein that leads to the interior space;
   a second endcap coupled to the second end of the filtering media; the second endcap including a disk portion secured to the second end of the filtering media, and at least one axially extending pin integrally formed with the second endcap and extending toward the interior space, the pin being configured to contribute, together with an axially facing fluid inlet opening through which the pin is intended to extend, to a flow restriction that is significantly less than about 5 psid; and
   a skirt integrally formed with and extending from the disk portion toward the interior space, the skirt is surrounded by the filtering media, the skirt surrounds the pin, and a plurality of ribs surrounded by the skirt that define fluid flow channels leading to the pin.

2. The filter cartridge of claim 1, wherein the pin includes a free end and the skirt includes a bottom edge, and the free end extends axially below the bottom edge.

3. The filter cartridge of claim 2, wherein the pin has a cross-shaped portion that terminates short of the free end and a constant diameter portion that extends from the cross-shaped portion.

4. The filter cartridge of claim 1, wherein the filtering media includes a central axis, and the pin is disposed along the central axis or offset from the central axis.

5. The filter cartridge of claim 1, wherein the filtering media is configured for filtering fuel, hydraulic fluid, lubrication fluid or air.

6. The filter cartridge of claim 1, wherein the opening is oval or circular.

7. A combination, comprising:
   a filter cartridge that includes:
      filtering media defining an interior space, the filtering media having first and second ends;
      a first endcap coupled to the first end of the filtering media, the first endcap including an opening defined therein that leads to the interior space;
      a second endcap coupled to the second end of the filtering media; the second endcap including a disk portion secured to the second end of the filtering media, and at least one axially extending pin integrally formed with the second endcap and extending toward the interior space, and a skirt integrally formed with and extending from the disk portion toward the interior space, the skirt is surrounded by the filtering media, the skirt surrounds the pin, and a plurality of ribs surrounded by the skirt that define fluid flow channels leading to the pin: and a filter housing that includes:
      a housing body defining a filter cartridge space for receiving the filter cartridge, a standpipe disposed in the filter cartridge space that is receivable through the opening, the standpipe including an internal flow passage, and an axially facing fluid inlet opening that places the internal flow passage in communication with the filter cartridge space, the axially facing fluid inlet opening being disposed at a first end of the standpipe and configured to receive the pin therethrough;
      a valve disposed in the standpipe adjacent the first end thereof that controls fluid flow through the axially facing fluid inlet opening and into the internal flow passage, the valve being axially moveable between a first position preventing fluid flow through the axially facing fluid inlet opening and into the internal flow passage and a second position at which fluid flow through the axially facing fluid inlet opening and into the internal flow passage is permitted, and the valve is actuatable to the second position by the pin extending through the axially facing fluid inlet opening; and
      the valve including a valve poppet and a spring engaged with the valve poppet that biases the valve poppet to the first position; and the valve poppet and the standpipe are configured such that a flow path is defined between the valve poppet and the standpipe when the valve poppet is at the second position thereby permitting fluid flow through the axially facing fluid inlet opening and into the internal flow passage:
      the pin being configured to contribute, together with the axially facing fluid inlet opening through which the pin extends, to a flow restriction that is significantly less than about 5 psid.

8. The combination of claim 7, wherein the valve poppet includes a hole defined therein that is configured to receive an end of the pin on the filter cartridge.

9. The combination of claim 7, wherein the valve poppet includes a valve head and a stem, and the spring is a coil spring that surrounds the stem and is engaged with the valve head.

10. The combination of claim 7, wherein the standpipe includes an internal surface with a plurality of radially inwardly projecting ribs, the valve poppet is guided by the radially inwardly projecting ribs as the valve poppet moves between the first position and the second position, and gaps are provided between the radially inwardly projecting ribs.

11. The combination of claim 9, wherein the standpipe includes a valve seat adjacent the axially facing fluid inlet opening, and the valve head is engaged with the valve seat at the first, position of the valve.

12. The combination of claim 9, further comprising a retainer disposed within the standpipe, a first end of the spring is engaged with the retainer and a second end of the spring is engaged with the valve head. and a plurality of fluid flow openings are formed in the retainer.

13. The combination of claim 7, wherein the pin includes a free end and the skirt includes a bottom edge, and the free end extends axially below the bottom edge.

14. The combination of claim 13, wherein the pin has a cross-shaped portion that terminates short of the free end and a constant diameter portion that extends from the cross-shaped portion.

* * * * *